Figure 1:
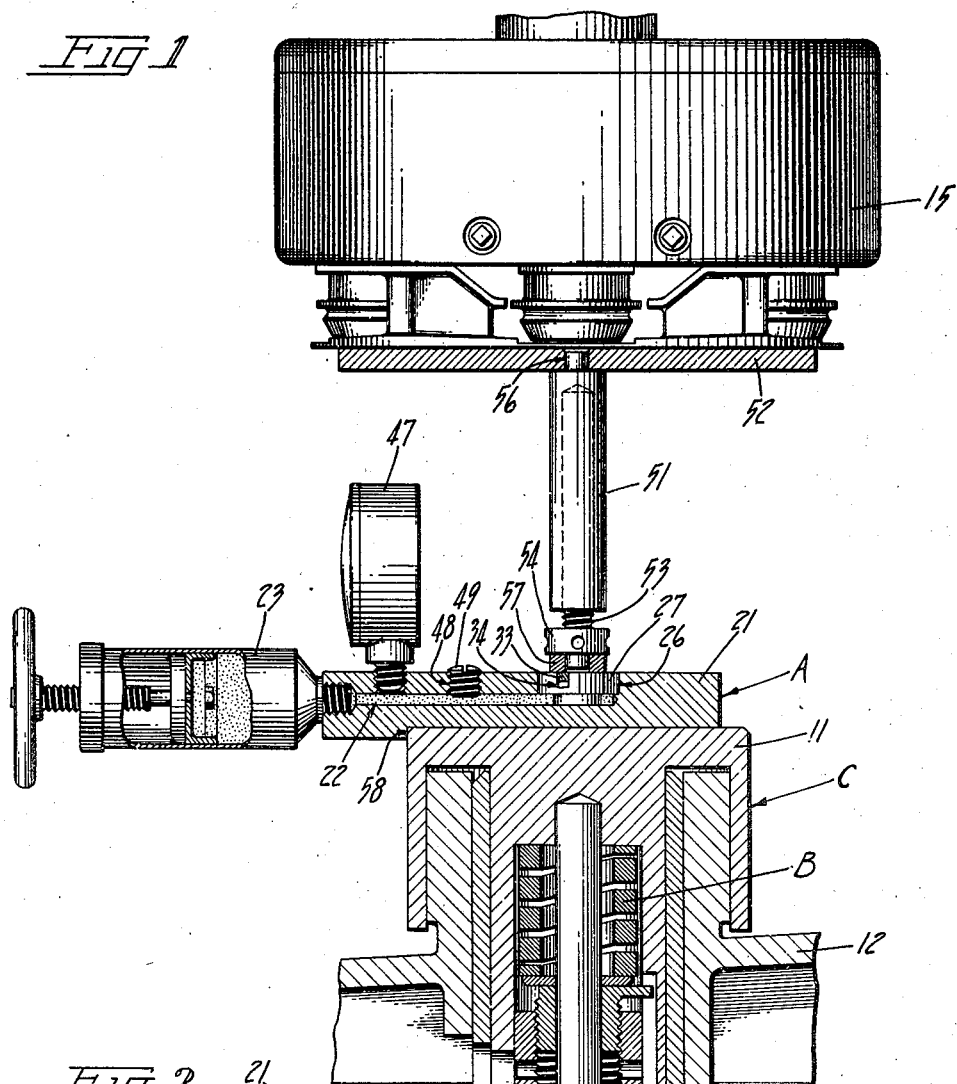

Feb. 11, 1947.   H. B. PATTERSON ET AL   2,415,440
SPRING TESTING DEVICE
Filed Dec. 16, 1943

INVENTOR.
Henry B. Patterson
Vincent F. Thomas
BY Ivan D. Thornburgh
Charles H. Eine
ATTORNEYS Patented Feb. 11, 1947

2,415,440

UNITED STATES PATENT OFFICE 2,415,440

SPRING TESTING DEVICE

Henry B. Patterson and Vincent T. Thomas, Los Angeles, Calif., assignors to American Can Company, New York, N. Y., a corporation of New Jersey Application December 16, 1943, Serial No. 514,560

5 Claims. (Cl. 73—161)

The present invention relates to a testing device and has particular reference to such a device for testing the strength of springs which are in inaccessible places in a machine or which are confined within parts of a machine.

In various kinds of machinery springs are used to exert predetermined pressures on certain parts. These springs must be frequently tested to determine how well they are withstanding continued use and to what extent their usefulness has been impaired, if any. In some cases the springs may be confined within complicated parts which require considerable time and labor to disassemble in order to free the spring for testing.

The present invention contemplates the provision of a portable testing device which may be inserted between a fixed part of the machine and a movable part which includes or surrounds the confined spring so that testing of the spring may be accomplished without removing it from the machine.

An object of the invention is the provision of a testing device for springs wherein simplicity of construction and compactness are essential features so that the device may be readily handled and may be applied to the machine between fixed and movable parts thereof for testing a confined spring while it remains in its place in the machine.

Another object is the provision of such a testing device which may be operated by any simple means of applying fluid pressure thereto, such as a manually operated grease gun, or air, oil or hydraulic pump or the like.

Another object is the provision of a testing device of this character wherein the results of testing may be read directly from a pressure gauge attached to the device.

Another object is the provision of such a testing device which may be used in a space between fixed and movable parts of the machine without dismantling any of the parts and so that testing of confined springs may be accomplished in most any portion of a machine.

Numerous other objects and advantages of the invention will be apparent as it is better understood from the following description, which, taken in connection with the accompanying drawing, discloses a preferred embodiment thereof.

Figure 2:
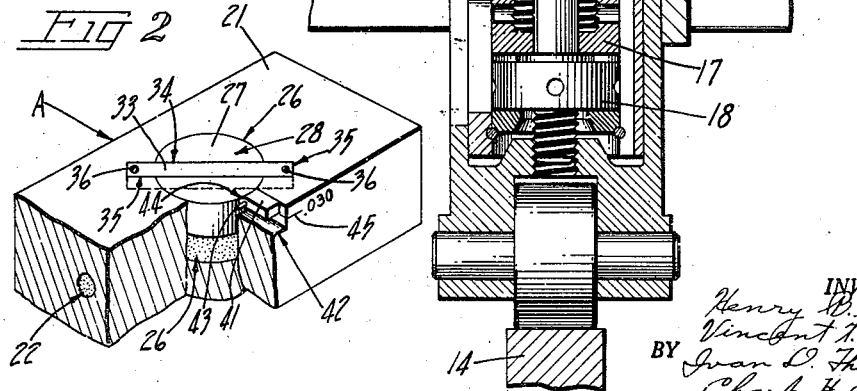

Referring to the drawing:

Figure 1 is a sectional view of a testing device embodying the present invention and showing the same in position for testing a spring confined within a can making machine, the spring and parts of the machine being shown in section and other parts being broken away; and Fig. 2 is an enlarged fragmentary perspective detail of the device shown in Fig. 1 with portions broken away and parts shown in section.

As a preferred embodiment of the instant invention the drawing illustrates a testing device A which by way of example is used for determining the effective pressure of compression springs B confined within lifter units C of a can or container closing or sealing machine of the type disclosed in United States Patent 2,039,338, issued May 5, 1936, to R. E. J. Nordquist, et al., on Vacuum closing machine. In such a machine a filled sheet metal can to be sealed with a cover loosely applied to it, is supported on a vertically movable lifter plate 11 carried in a rotatable turret 12. At the sealing station in the machine, the lifter plate is raised by a cam 14 to lift the can and its cover into sealing engagement with a rotatable sealing head 15 for the interfolding of flange parts of the can and the cover into a seam which permanently unites the cover with the can. This is a usual can sealing practice.

In sealing cans in this manner, it is important for best results, that the lifter units C during the sealing operation, hold the can and its cover in place within the sealing head 15 under a pressure which is best adapted to the interfolding of the can and cover flange parts. This pressure is brought about by the compression springs B. The springs are confined within the lifter units and provide a yieldable element between each lifter plate 11 and the cam 14. Adjusting nuts 17, 18 located within the units, and operable from outside the units are provided to adjust the springs to keep them at the proper working pressure.

In operation this proper sealing pressure is effective only for a predetermined compression of the spring, which compression in the present case is about thirty thousandths of an inch and which is brought about when the can and its cover are forced against the sealing head 15 at the end of the upstroke of the lifter unit. There is thus a predetermined effective pressure exerted by the spring for an effective length or compression of the spring and it is these properties of the spring which must be maintained for best operation of the machine and which it is desired to test with the testing device A of the instant invention. Although the above explanation is directed to that of a can making machine, it will be apparent that the invention is equally well adapted to almost any kind of machine and to springs of either the compression or tension type.

The testing device A includes a flat body member or element 21 of substantially rectangular cross-section adapted to be placed against the movable element of the machine which in the instant case is the lifter plate 11. This body member is formed with a fluid passageway 22 which extends through the middle of the member for a large part of its full length. One end of the passageway communicates with the interior of a suitable fluid pressure pump or manually operated gun 23 which may be removably secured to one end of the body member. The pump or gun may be of any commercial type suitable for containing and forcing a fluid pressure medium, such as light grease, oil, or air or the like into the passageway of the body member.

The opposite end of the passageway 22 communicates with a cup shaped recess 26 formed in the top of the body member 21. The recess contains a cylindrical testing block 27 having a flat outer face 28 which is normally flush with the outside surface of the top of the body member. The block is movable outwardly under pressure of the fluid pressure medium hereinbefore mentioned and is carefully fitted into the recess to allow this outward movement while at the same time preventing leakage of the pressure fluid past the block.

The testing block 27 is retained in its recess against complete removal and against turning by a cross bar 33 disposed below the top surface of the block in a clearance groove 34 formed in the block. The ends of the cross bar extend into tight fitting recesses 35 formed in the body member 21 and are secured in place by screws 36.

The testing block 27 is used to exert pressure upon movement against the stationary part of the machine which in the instant case is the sealing head 15. Movement of the testing block 27 within its recess 26 while under pressure is visually indicated by an indicator element or finger 41 (Fig. 2) which is disposed in a clearance groove 42 formed in the top of the body member 21. The finger adjacent its inner end is mounted on a pivot pin 43 journaled in the body member. The inner end of the finger is rounded and fits within a socket 44 formed in the side of the testing block. The outer end of the finger terminates adjacent the outer end of the groove 42.

Due to the location of the pivot pin 43 near the testing block 27 (as shown in Fig. 2) a slight movement of the block will be greatly multiplied at the outer end of the finger and thus can be readily observed at this outer finger end. One or more gauge marks 45 cut into the body member adjacent the groove 42 may be used for showing the movement of the testing block. In the instant case where the springs B have an effective compression of thirty thousandths of an inch a gauge mark is used to indicate this amount of movement of the testing block.

Fluid pressure created within the testing device by the pump or gun 23 is read directly from a pressure gauge 47 which is threadedly secured in the body member 21 and the interior gauge passageways are in communication with the passageway 22. A bleeder hole 48, normally closed with a setscrew 49 communicates with the block passageway and may be used for bleeding the passageway of fluid when desired.

Where the space between the stationary part and the movable part of the machine at the place where the spring to be tested is located, is greater than the thickness of the body member 21, a spacer rod 51 and a backing plate 52 are used. The rod is fitted with an adjustable extension screw 53 having an adjusting head 54 for changing the length of the rod to bridge the required space.

Testing of the springs B in the lifter units C is performed when the machine is stopped. In using the testing device, its body member 21 is placed on the lifter plate 11, the backing plate 52 is placed against the bottom of the sealing head 15 and the rod 51 is interposed between the two and is adjusted as to length by turning the adjusting screw head 54 to hold the body member and the backing plate in place, snugly but without exerting any pressure on the testing block 27. The upper end of the rod is shouldered and is seated in a pilot hole 56 formed in the backing plate while the lower end is seated against a collar 57 which rests on top of the testing block 27. A stop shoulder 58 on the bottom of the body member 21 is used to facilitate locating the testing block in vertical alignment with the spring B confined within the lifter unit.

With the testing device in this position between the lifter plate 11 and the sealing head 15, it is merely necessary to operate the gun 23 to create a fluid pressure within the passageway 22 to build up the pressure against the testing block 27. Building up of this pressure against the testing block results in relative movement between the block and its body member 21. Since the block is held stationary by the spacer rod 51, it is the body member 21 that moves and presses the lifter plate 11 down against the resistance of the compression spring B. The movement of the body member is therefore the actual compression of the spring.

During this building up of the pressure, the compression of the spring B is carefully watched by observing the movement of the indicator finger 41. When the finger indicates the desired amount of compression of the spring, building up of the pressure is stopped, and the reading on the gauge 47 is taken.

If the spring is functioning properly the reading on the pressure gauge 47 should show the desired effective pressure of the spring for its effective compression. If the spring is not functioning properly the reading will be too high or too low for this effective compression. Adjustment of the spring pressure may then be made by manipulation of the adjusting nuts 17, 18 in the lifter unit C. After adjustment of the nuts, the test should be repeated as a check. After such a testing operation the built-up pressure against the testing block may be readily dissipated by reversing the operation of the gun or by opening a valve in the line if a pump is used.

The testing device in itself is of light weight and compact and may be carried from place to place in the kit of roadmen or inspectors and may be readily used with little training to check many installations of springs in confined or inaccessible places.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A device for testing the strength of a spring in a machine, comprising in combination, a substantially flat body element having a fluid pressure recess therein, the outer end of said recess being disposed in the plane of an outer surface of said body element, said body element being insertable between a fixed member and a movable member including the spring of the machine, a movable testing block disposed within the recess of said body element and having its outer surface operable against one of said members, means communicably connected with said recess for creating a fluid pressure therein against said testing block for transfer to the spring being tested to change its length a predetermined amount, a movable indicator element mounted on said body element and operable by the movement of said testing block for indicating the amount of change of length of the spring, and a pressure gauge on said body element communicating with said pressure recess for measuring the pressure applied to said spring to change its length.

2. A device for testing the strength of a spring in a machine, comprising in combination, a body element having a fluid pressure recess therein, said body element being insertable between a fixed member and a movable member, including the spring of the machine, a movable testing block located within the recess of said body element and operable against one of said members, means connecting with said recess for creating a fluid pressure therein against said testing block for transfer to the spring being tested to change its length a predetermined amount, an indicator finger pivotally mounted in said body element and disposed within the outer surfaces of said body in a protected location in a groove formed in the body, one end of said indicator finger engaging within a socket formed in said testing block and being movable with said block for rocking the finger on its pivoted mounting, the other end of said finger being disposed adjacent a scale for indicating the amount of change of length of the spring being tested, and a pressure gauge on said body element and in communication with said pressure recess for measuring the pressure applied to said spring in changing its length.

3. A device for testing the strength of a confined spring in a can making machine, comprising in combination a substantially flat body element having a fluid pressure recess therein communicating with a flat outer surface thereof, said body element being insertable between a fixed member and a movable member including the confined spring of the machine, a movable testing block located within the recess of said body element and having its outer end normally substantially flush with said flat outer surface of said body element and operable against one of said members, means secured in said body for retaining the testing block in said recess, means communicably connected with said recess for creating a fluid pressure therein and against said testing block for transmission of said pressure to the spring being tested to compress the spring a predetermined amount, a pressure gauge on said body element communicating with said pressure recess for measuring the pressure applied to said spring, and movable means carried by said body element and engaging said testing block for visually indicating the amount of compression of said spring as a result of relative movement between said testing block and body element.

4. A device for testing the strength of a spring in a machine, comprising a substantially flat body element having a fluid pressure recess therein, the outer end of said recess being disposed in the plane of an outer surface of said body element, said body element being insertable between a fixed member and a movable member including the spring of the machine, a movable testing block disposed within the recess of said body element and having its outer surface operable against one of said members, means communicably connected with said recess for creating a fluid pressure therein against said testing block, said fluid pressure in the recess moving said body element towards the spring to compress the same a predetermined amount, a pressure gauge on said body element communicating with said recess for measuring the amount of pressure applied to said spring, and means actuated by relative movement between said body element and said testing block for indicating the amount of such relative movement.

5. A device for testing the strength of a spring in a machine, comprising a body element having a fluid pressure recess disposed within a substantially flat outer surface thereof, said body element being insertable between a fixed member and a movable member including the spring of the machine, a testing block disposed within the recess of said body element and operable against one of said members, said block being movable towards and away from the bottom of said recess, adjustable means engageable with said testing block and insertable between the body element and one of said machine members for spanning the space between said members, means removably and communicably connected with said body element recess for creating a fluid pressure therein, said fluid pressure in the recess moving said body element towards the spring to compress the same a predetermined amount, a pressure gauge on said body element communicating with said recess for measuring the amount of pressure applied to said spring, and means actuated by the relative movement between said body element and said testing block for indicating the amount of such relative movement.

HENRY B. PATTERSON.
VINCENT T. THOMAS.

REFERENCES CITED

The following references are of record in the file of this patent:

UNITED STATES PATENTS

| Number | Name | Date |
|---|---|---|
| 1,650,736 | Zelov | Nov. 29, 1927 |
| 1,822,587 | Essen | Sept. 8, 1931 |
| 1,822,463 | Taber | Sept. 8, 1931 |
| 1,907,835 | Langbein | May 9, 1933 |
| 1,877,367 | Seppmann | Sept. 13, 1932 |
| 2,254,656 | Kennon | Sept. 2, 1941 |

FOREIGN PATENTS

| Number | Country | Date |
|---|---|---|
| 541,203 | British | Nov. 17, 1941 |